United States Patent [19]
Gallagher

[11] 3,825,180
[45] July 23, 1974

[54] AIRCRAFT APPROACH GUIDE
[76] Inventor: John D. Gallagher, R.R. No. 1, Inglewood, Ontario, Canada
[22] Filed: June 21, 1973
[21] Appl. No.: 372,019

[52] U.S. Cl............. 235/78 HO, 235/88 N, 235/89
[51] Int. Cl............................................. G06c 27/00
[58] Field of Search......... 235/61 NV, 65, 77, 78 N, 235/83–85, 88 N, 89

[56] References Cited
UNITED STATES PATENTS

| | | | |
|---|---|---|---|
| 3,100,601 | 8/1963 | Shapiro | 235/88 N X |
| 3,220,644 | 11/1965 | Gaudio | 235/84 X |
| 3,262,640 | 7/1966 | Jameson | 235/78 N |
| 3,497,681 | 2/1970 | Warner | 235/78 N |
| 3,693,873 | 9/1972 | Otte | 235/61 NV |

Primary Examiner—Lawrence R. Franklin
Attorney, Agent, or Firm—Burns, Doane, Swecker & Mathis

[57] ABSTRACT

A landing approach computer is disclosed which allows computation of landing approach data in relation to ground speed. The computer is cooperable with a grid which provides a profile display of a glide path which is related to the data obtainable from the computer. Both the computer and the grid are cooperable over an infinite range of parameters.

4 Claims, 4 Drawing Figures

AIRCRAFT APPROACH GUIDE

BACKGROUND OF THE INVENTION

This invention relates generally to a novel combination landing approach computer and flight profile monitor. More particularly, this invention relates to a guide which will aid a pilot while making a final approach to a preselected landing site.

Conventionally, when a pilot manuevers his aircraft into position for landing, he will generally compute the time to touchdown and rate of descent and retain this information from memory or will write it down. If a sudden change takes place in conditions such as, say wind speed or wind direction, or if certain air traffic control problems occur, the pilot may be required to alter his course and recalculate the time to touchdown and rate of descent of the aircraft. In any event, the landing of an aircraft under rapidly changing conditions may require a degree of concentration which may make it easy for the pilot to forget which set of numbers he is presently operating under.

There are a variety of "pilot computers" existing under the present state of the art. Most of these computers or calculators are of a circular slide rule type. These devices may be used like any mathematical slide rule, and a pilot can calculate various parameters. However, there exists a problem with all such circular types of computers, viz., there is no "right side up." A pilot must first examine the computer to determine which scale he wants to utilize. The pilot may then be required to rotate the circular rule in order to orient the numbers on the scale he wishes to utilize such that the numbers are "right side up." With conventional devices, there exists a strong likelihood that a pilot may take only a quick glance at his computer while controlling his aircraft in a descent. Under such circumstances, there is also a likelihood that the pilot may look at a similar but wrong number. It will, of course, be appreciated that a miscalculation or improperly read scale may produce serious consequences to property and life.

Pilot computers are most often utilized while the aircraft is being piloted under instrument flight regulations (IFR). Since many calculations are required to be made during the descent of the aircraft, if a pilot does not have the benefit of the assistance of a co-pilot, the pilot will be required to observe and manipulate his computer with one hand while controlling the aircraft with the other. Under certain conditions, especially foul weather, it may be virtually impossible for the pilot to both effectively maintain control of the aircraft and make calculations on conventional computers. The problems involved become especially acute if the control tower or other air traffic control center requests at the last moment that a pilot change the runway onto which he was intending to land. Under such last minute circumstances, computations must be made under great haste, and hence, the probability for error becomes very high.

These problems are yet further compounded at night when cockpit lighting makes it even more difficult to effectively read conventional pilot computers.

It is therefore, a general object of the present invention to provide a combination landing approach computer and flight profile monitor which minimizes or reduces the problems of the type previously noted.

It is a more particular object of the present invention to present to a pilot a visual picture of the flight pattern of his aircraft during descent for a landing which will provide the pilot with an indication of his altitude in relationship to the distance to the landing threshold.

It is yet another object of the present invention to provide the pilot with a visual indication of his altitude in relationship to obstructions in the vicinity of his landing site.

Another object of the present invention is to provide a pilot with a visual indication of the relationship between the ground speed of his aircraft and distance to the threshold of the landing site and to coordinate this relationship with the estimated time which will elapse before making either visual or physical contact with that landing site.

Similarly, a further object of the present invention is to provide a pilot of an aircraft with a visual indication of the descent path which should be expected of his aircraft under a specified set of conditions.

Of independent significance is the object of the present invention to provide a pilot with a picture or graphical indication of the position of his aircraft during a descent rather than merely a set of numbers from which the pilot must mentally envision his position.

An additional object of the present invention is to provide a pilot computer which may be quickly oriented to properly align the numbers thereon for easy reading with minimum chance for error.

It is a related object of the present invention to provide a set of windows to reveal only relevant data to the pilot and to hide from view scales which may cause confusion.

It is likewise an object of the present invention to provide a combination landing approach computer and flight profile monitor which will give a pilot with a minimum of mathematical experience an apparatus which is useful and simple to understand.

Of further significance is the object of the present invention to provide a combination landing approach computer and flight profile monitor which may be manipulated with one hand.

It is also an object of the present invention to provide a combination landing approach computer and flight profile monitor operable to simultaneously provide data relating to ground speed, time to touchdown and rate of descent.

An additional object of the present invention is to provide a combination landing approach computer and flight profile monitor which will substantially reduce the information required to be remembered by a pilot during a landing approach.

Similarly, it is an object of the present invention to improve the safety of instrument flight operations.

Finally, it is an object of the invention to provide a combination landing approach computer and flight profile monitor which is compact, accurate, and inexpensive to manufacture.

SUMMARY OF A PREFERRED EMBODIMENT OF THE INVENTION

A combination landing approach computer and flight profile monitor according to a preferred embodiment of the present invention intended to substantially accomplish the foregoing objects includes a substantially planar disc member having a plurality of data margins thereon, a substantially planar base member overlying the disc member, means for rotatively connecting the disc member and the base member, window means disposed in the base member and cooperable with the disc member for exposing portions of the data margins to provide a functional relationship among the data and a means for graphically displaying a projected flight profile of an aircraft operable in accordance with the data exposed by the window means. The projected flight profile may be graphically displayed by a rectangular grid provided on the face of the base member and having an abscissa labeled with nautical miles and kilometers to the threshold of the landing site. Similarly, the ordinate of the grid is labeled in both feet and meters above the runway. Glide slopes, drawn to scale, are pre-plotted on the grid to display descent paths to the landing site threshold.

BRIEF DESCRIPTION OF THE DRAWINGS

Other objects and advantages of the present invention will become apparent with reference to the following detailed description of a preferred embodiment thereof in connection with the accompanying drawings, wherein like reference numerals have been applied to like elements, in which.

DETAILED DESCRIPTION OF A PREFERRED EMBODIMENT OF THE INVENTION

Figure 1:
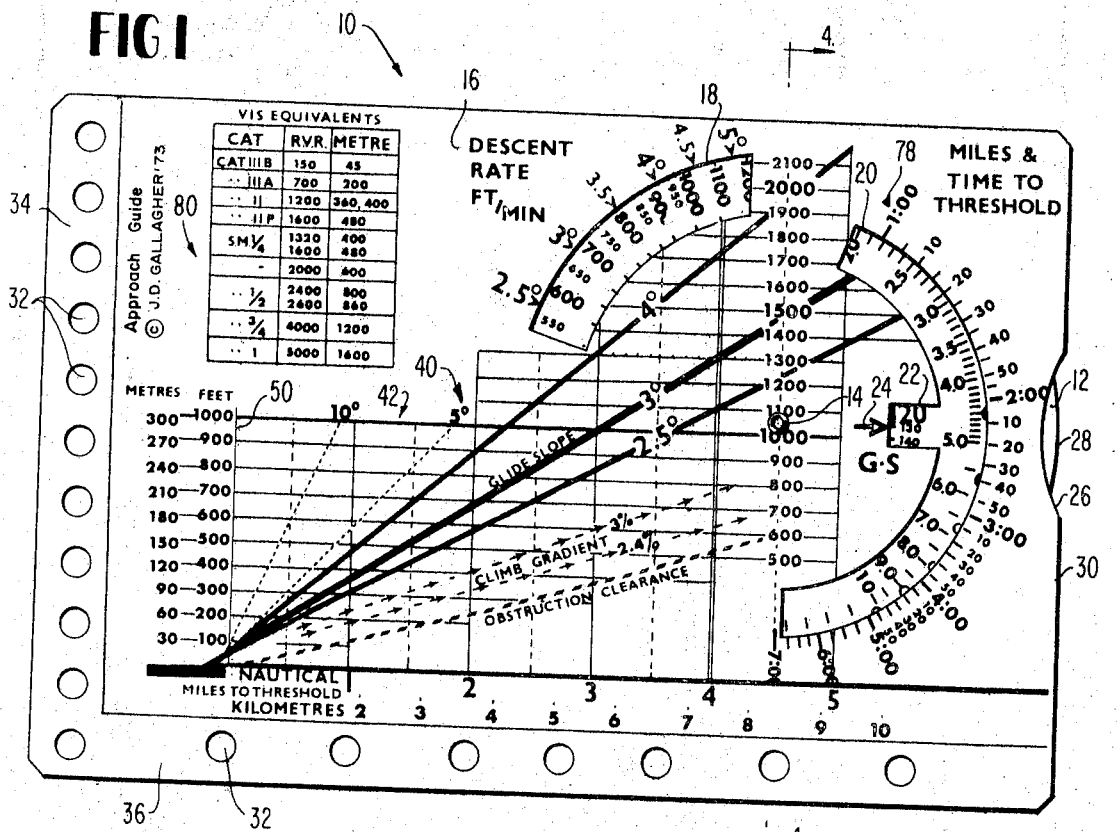
FIG. 1 is a plan view of the present invention.

In FIG. 1 there is shown a combination landing approach computer and flight profile monitor 10 according to the present invention. A substantially planar disc member 12 is attached by means of a rivet 14 to a substantially planar base member 16. The base member 16 overlies the disc member 12, and portions of the disc member 12 are exposed by means of a plurality of windows 18 and 20 disposed in the base member 16. Data printed on the disc member may be observed through the windows.

However, a significant portion of the data is covered by the base member 16 in such a manner that only selected and mathematically related data is exposed at any given time. An indentation 22 in one of the windows functions as an input parameter isolation means to isolate from other confusing similar numbers the input parameter of ground speed of the aircraft. The ground speed is designated by the letters "G-S" adjacent the input parameter indication arrow 24 adjacent the indentation 22. It will be appreciated that the windows are arcuate on a radius about the rivet 14. A slight cut-away 26 is disposed along an edge of the base member 16 to facilitate manual rotation of the disc member 12. The disc member 12 is situated such that its outer peripheral edge 28 does not extend significantly beyond an outer peripheral edge 30 of the base member 16. This arrangement minimizes damage to the disc member, which damage might impede operation of the apparatus 10.

A plurality of perforations 32 are disposed along a first 34 and a second 36 edge of the base member 16. This arrangement facilitates insertion of the apparatus into a standard airport approach chart binder. Conventional airport charts are "5×8" and, hence, the apparatus 10 may be constructed to approximately the same dimensions.

Smaller pocket versions of the apparatus may be produced to a size approximately 65 percent of the airport approach chart size. Such a smaller pocket version would still be readable and could be conventionally held in one hand or otherwise situated in a pocket.

Figure 2:
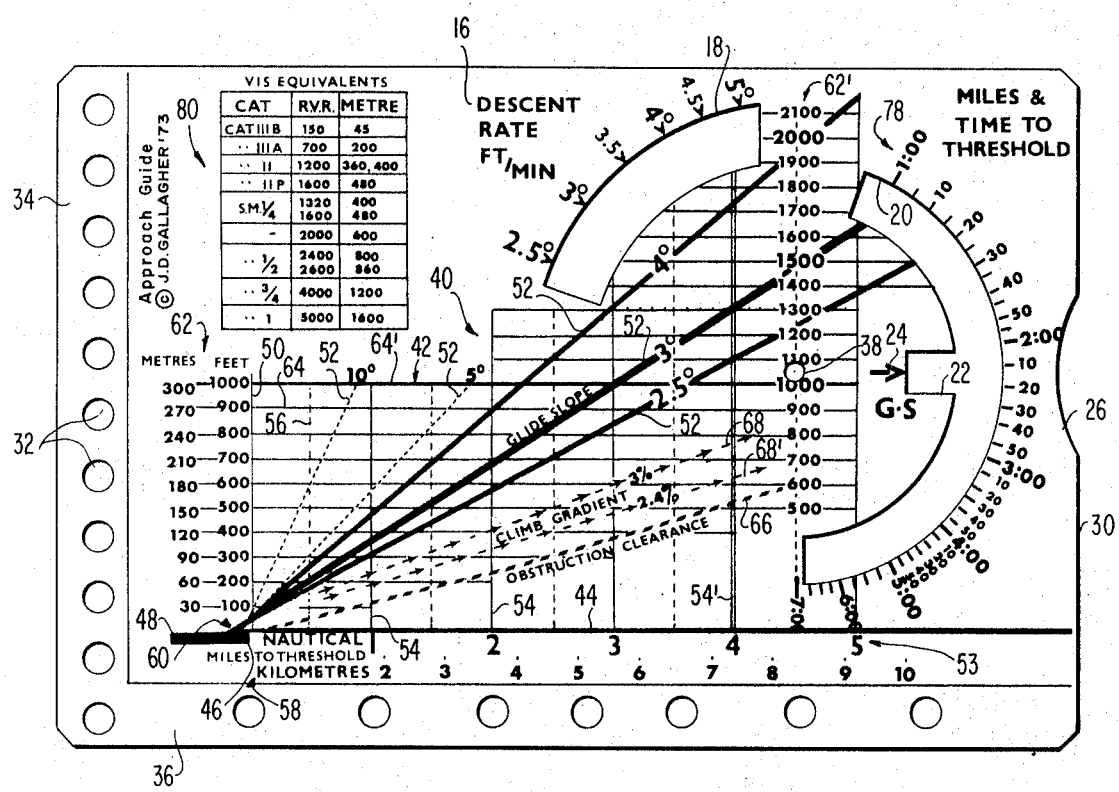
FIG. 2 is a plan view of the base member of the present invention.

FIG. 2 illustrates the base portion 16 of the present apparatus. It can be seen that the first window 18 and the second window 20 are disposed at different radii from the aperture 38 through which the connecting rivet 14 passes. Such an arrangement facilitates the reading of the computer portion of the present apparatus. Whereas the indentation 22 in window 20 functions as an input parameter isolation means, it will be appreciated that a separate window could be provided and placed radially inwardly of the illustrated arrangement.

In both FIGS. 1 and 2, the flight profile monitor portion of the present invention may be seen. A graphical display or profile monitor 40 for an aircraft making a descent along a glide path to the airport is shown. During the operation of an aircraft, the glide path selected may be determined with reference to "An Approach Fix," radio intersection or precision approach glide slope intercept or other navigational aid from or over which the final approach to an airport is executed. In some cases the descent will follow completion of an instrument landing system procedure turn. Of course, it will be appreciated that the present apparatus may be utilized merely in the descent from a first altitude to a second altitude considerably above a potential landing site.

A grid 42 is provided having an abscissa 44 labeled with nautical miles, and kilometers to an end or threshold 46 of the anticipated landing site or runway 48. Similarly, the ordinate 50 of the grid is labeled in both feet and meters above the runway. Glide paths 52, drawn to scale, are pre-plotted on the grid 42 to provide a graphical representation of the position of an aircraft and altitude relative to a fifty foot clearance at the threshold 46. This hypothetical 50 foot clearance is in accordance with federal regulations. It will be noted that for certain unusually large aircraft, it has been the practice to allow a clearance up to 75 feet at the threshold of the landing site. In such instances, only minor adjustments need be made by the pilot of such an aircraft to comply with such a practice while utilizing the present invention.

Glide paths 52 have been drawn on the grid to indicate glide slopes of 2.5°, 3°, 4°. Two additional broken lines have been shown representing 5° and 10°. Because a glide slope of 3° is a preferred descent path, the 3° line on the flight monitor portion 40 of the present invention has been emphasized by printing the same as a heavier line.

As noted above, a runway 48 is schematically shown at the extreme left of the flight profile monitor portion 40 and corresponds to the origin of the grid 42. The abscissa 44 of the grid 42 corresponds to zero altitude.

Also, as noted above, mileage is shown along the abscissa 44 immediately below the zero altitude line. Because nautical miles are conventionally used in connection with the measurement of distance to threshold, the indications of nautical miles are shown by a nautical mile scale 53 in enlarged print. Solid vertical lines 54 are utilized at the zero, one, two, three, four and five nautical mile points to facilitate the monitoring of the descent during final approach. A double line 54' is provided at the four mile reference point since this is conventionally the mileage utilized for the commencement of the descent for a final approach. Broken lines 56 are provided to indicate half-mile increments.

To facilitate the worldwide use of the present invention in countries utilizing the metric system, a kilometer scale 58 is provided below the nautical mile scale. As can be seen from FIGS. 1 and 2, distances of 2,3,4,5,6,7,8,9, and 10 kilometers are shown.

The distances or "mileages" along the abscissa 44 of the grid 42 are measured from the threshold or end 46 of the runway 48, as opposed to distances to either the touchdown point of the aircraft or to the glide path intersects 60 on the runway.

The altitude scale 62 along the ordinate of the grid utilizes horizontal lines 64 to facilitate monitoring the flight path or profile of an aircraft on final approach. Each horizontal line represents 100 feet. A heavier line 64' is drawn for the 1,000 foot altitude line since this altitude is a conventional reference point utilized for instrument landings. A corresponding altitude scale 62' is disposed along the right hand side of the grid with altitudes ranging from 500 to 2,100 feet in 100 foot increments.

An altitude scale showing meters is adjacent the left side of the graph and corresponds to the altitude scale markings in feet. The metric altitude scale may facilitate use of the present invention in countries utilizing the metric system.

Three heavy solid lines are provided as a visual representation of a 2.5°, 3°, and 4° glide slope. These are the three glide slopes most commonly utilized in aircraft operation. All of the glide paths represented by these glide slopes intersect at a point representing a fifty foot clearance over the end of the runway in conformance with domestic and foreign regulations.

A single heavy broken line 66 is shown below the glide slope lines to depict the standard obstruction clearance in accordance with worldwide regulations. The obstruction clearance line begins approximately 200 feet from the end of the runway and then rises in altitude at a 1.50 gradient to a point at an altitude of 200 feet which is 10,200 feet from the runway. The obstruction clearance line continues to rise at a 1:40 gradient until it reaches a point at an altitude of 600 feet where the line stops. Beyond this point, a minimum en route altitude of 1,000 feet is normally required. The obstruction clearance line 66 indicated on the grid is appropriate for the glide path of 2.5°.

If obstructions exist in a given situation which rise above the altitude of the obstruction clearance line, then the glide slope must be increased to 3° or 4° or even higher. The vertical distance between the glide slope and the obstruction clearance line for any given distance from the threshold is normally the same. If the obstruction line rises, so does the glide slope.

Whereas the apparatus of the present invention will find its maximum utility in landing situations, this apparatus does have utility in take-off situations. As can be seen from FIGS. 1 and 2, two broken lines 68 and 68' comprised of a series of arrows and dashes are indicated on the grid. These lines show a 3% and 2.4% climb gradient respectfully. The projections of these two climb gradient lines intersect at a point approximately 35 to 50 feet over the threshold of the runway and indicate the path of a climb on a 3% and a 2.4% gradient out from the threshold of the runway for a distance of approximately 4 miles. Whereas these lines do not cooperate with the computer portion of the present invention, they are useful as additional guidance information for the pilot. He can see a visual representation of his climb altitude versus mileage and can hence judge whether or not he will be able to clear obstacles interposed in his flight path. If the pilot noted that he would be close to such an obstruction, he would then check his flight manual for exact information. The climb gradient indications on the graph portion are, under present FAA regulations, an indication of minimum performance criteria. The minimum climb performance criteria for a four engine aircraft is the 3% gradient line; a two engine aircraft must meet the 2.4% gradient line.

It should be noted at his juncture that the climb gradient is indicated by a percentage whereas the glide slope is indicated by degrees. Hence, an approaching aircraft might descend along the 3° glide path to the minimum altitude and then climb out along the 3% gradient path. It will be appreciated that such data will be useful to a pilot in an "overshoot" or "go around" situation.

Figure 3:
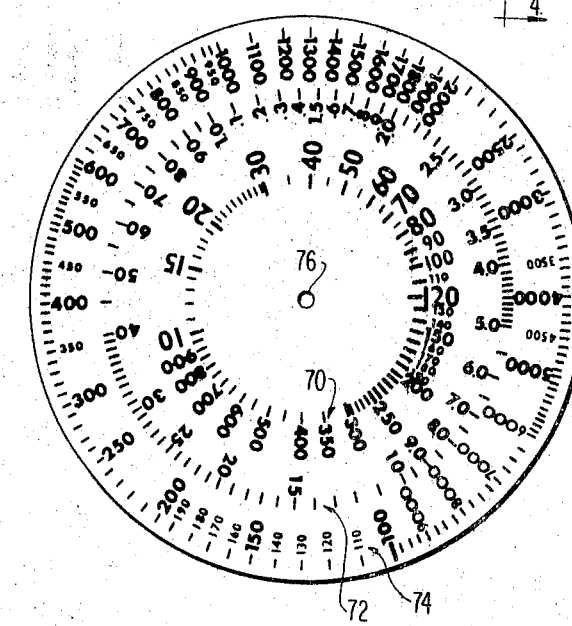
FIG. 3 is a plan view of the disc member of the present invention.

Looking now to FIG. 3, there can be seen the disc portion 28 of the present invention. A first scale 70, second scale 72, and a third scale 74 are circumferentially inscribed on the disc portion. These three concentric data scales are mathematically related. All three scales are semi-logarithmic, i.e., a full 360° turn will produce two logarithmic cycles.

The scale 70 along the inside margin is used to represent ground speed. The scale 70 is virtually endless, although it may be said that the scale starts at ten knots and increases to 100 knots 180° around the scale, and then further increases to 999 knots. It will, of course, be appreciated that ten could also represent 1,000 knots by simply interposing a multiple of 100. Correspondingly, all speed would be increased by the multiple of 100 so that the scale has infinite flexibility.

The middle margin carries the scale 72 representing mileage. Similarly, this scale is virtually endless. However, it can be said that the scale starts at 1 mile and increases to 10 miles at 180° around the scale, and then further increases to 99 miles. A multiple factor may also be introduced in the use of this scale.

The outside margin carries a scale 74, used to represent rate of descent. This scale is virtually endless. However, it may be said that it begins at 100 (feet/minute) and increases to 1,000 (feet/minute) at 180° around the scale, and then further increases to 9,999 (feet/minute) as the scale is completed. Similarly, a multiple may be introduced in the use of this scale.

The disc 28 shown in FIG. 3 is situated behind the base portion shown in FIG. 2 to produce an arrangement generally illustrated in FIG. 1. The disc is rotatably attached to the base portion by means of a rivet 14 which passes through aperture 76 at the geometrical center of the disc. The windows 18 and 20 cut in the base portion 16 of the apparatus display data inscribed by any conventional means on the disc portion of the computer. As noted above, these windows are situated so as to simultaneously display data that is mathematically related. The window 18 is marked "DESCENT RATE FT/MIN." The window 20 is marked "MILES AND TIME TO THRESHOLD." The indentation 22 is marked "G-S" corresponding to ground speed. As noted above, these windows and their arrangement provide an important feature of the present invention. By utilizing these windows there is blocked out of view unnecessary data so that the pilot of an aircraft or other person utilizing the present invention would not be subjected to unnecessary numbers, and, hence, the probability of making an error due to a misreading of the calculator will be minimized.

As may be seen in FIGS. 1 and 2, a time scale is located along a peripheral edge of the window 20. Time is indicated in minutes and seconds starting at 1 minute and increasing to 7 minutes. It should be noted that there is, as a practical matter, no particular need to show any time in excess of 4 or 5 minutes since a descent substantially never exceeds these durations. However, the scale was extended to seven minutes simply because there is room to do so.

Located in the upper left corner of the present apparatus, there is a visibility equivalent guide 80. This is known information to most pilots and is included in the present invention as a convenient feature and as a quick reference. This guide is marked "VIS EQUIVALENTS."

Figure 4:
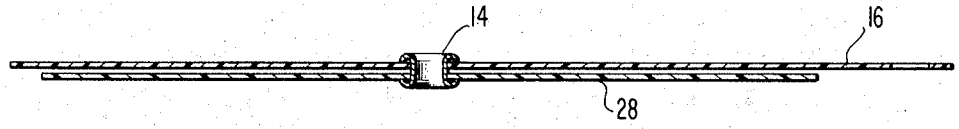
FIG. 4 is a cross sectional view taken along section line 4—4 in FIG. 1.

FIG. 4 shows a cross sectional view of the present apparatus along the section line shown in FIG. 1. The rivet 14 should be of an appropriate material and of an appropriate configuration to permit the rotation of the disc 28 relative to the base member 16 when the disc member is manually rotated at the cut away portion 26 of the base member. However, sufficient friction should be provided to prevent the disc 28 from spinning freely relative to the base portion so that once a setting is achieved, it will remain intact until the disc is manually rotated at a later time.

It will be appreciated that additional glide slopes could be introduced onto the grid of the present invention. However, since the great majority of all descents are made along glide paths having a glide slope in the range of 2.5° to 5°, the placement of additional glide slope data might lead to confusion and reduce the ability to effectively utilize the present invention. In any event, if a pilot is faced with an altitude/mileage combination that is "off the chart," a constant multiple may be introduced to extend the range of the values shown.

It will be further noted that the present invention may be utilized independent of aircraft type, size, or speed. The data available from the computer and the flight profile which may be monitored on the grid portion will be appropriate whether the vehicle involved is a small single engine trainer, a jumbo passenger jet, or a space capsule.

The particular details of the present invention show values of speed in knots, rate of descent in feet/minute, etc. There is, of course, no intention to limit the present invention to these details as shown, since any related units of measurement could be utilized in the practice of this invention.

EXAMPLES

Through the use of examples, there will be realized the advantages and novelty of the present apparatus. It will be noted that reference to this apparatus has been made in connection with descent rate. The primary utility of the present invention lies in the assistance of a pilot landing his aircraft. However, the present invention may also be utilized in assisting a pilot while taking off. The disclosed apparatus is operable as a rate of climb computer, and, if so utilized, all data obtained from both the computer and the flight profile monitor would still be accurate.

EXAMPLE I

Current FAA regulations limit the maximum speed below 10,000 feet to 250 knots airspeed under normal circumstances. Most aircraft descend on an angle of approximately 3°. This is not by regulation, nor design, but happens to be an average result that occurs.

Many factors limit the rate of descent of an aircraft and one such factor would be the pressurization controls and procedures. In most aircraft, the "cabin altitude" can be made to descend at a passenger comfortable rate of 300 feet per minute, while the aircraft is actually descending at 1,500 feet per minute. This is an example of just one such factor.

In this Example, assume that a pilot notes that he has a 100 knot tailwind. The descent airspeed is 250 knots. The speed over the ground is 350 knots. By setting 350 knots in the groundspeed window, the pilot would note that his normal passenger comfort rate of descent which corresponds to an aircraft rate of descent of 1,500 feet per minute is around 2.4 degrees.

From the Guide he notes that 50 miles from the airport his altitude should he approximately 13,000 feet rather than approximately 16,000 feet (with no wind). He would establish his descent to meet these altitudes, i.e., all along the 2.4 degree line.

If the pilot had a 50 knot headwind, he could set 200 knots ground speed and not that he could stay at a high altitude longer and that at 50 miles he should have an altitude of, say, 22,000 feet.

For operation at a higher altitude, many jet pressurization systems can take a greater descent rate. Assume, now, that a pilot receives a clearance to descend from 30,000 feet to 20,000 feet. If the pilot notes that his groundspeed is 600 knots at 30,000 feet, then to lose 10,000 feet at approximately 3,000 feet per minute the aircraft will assume a 3 degree glide slope. At 600 knots, there would be required 30 miles to descend from 30,000 feet to 20,000 feet. Similarly, if the ground speed is 400 knots, the required distance to lose 10,000 feet would be 20 miles. If the ground speed is 700 knots, the required distance to lose 10,000 feet would be 40 miles.

The grid portion provides the pilot with a visual presentation of his flight path, and it becomes very easy for the pilot to multiply the numbers on the scales around the edges of the grid portion by a given constant. If 5 miles is multiplied by 10, it becomes 50 miles along the scale 53. Doubling 50 to obtain 100 miles would provide a corresponding altitude of 33,000 feet on scale 62' (or 10 × 1,650 [approximately]×2). Whereas a mental visualization of such a position may be subject to error, by providing an actual pictorial flight profile, error is thereby minimized.

EXAMPLE II

When an instrument approach is attempted, a glide slope radio course may be followed by the pilot utilizing known electronic equipment. The purpose of a glide slope radio course is to furnish vertical guidance along the correct descent angle to proper touchdown point on the runway. At the present time, an instrument approach all the way to touchdown is not yet authorized except for the most highly advanced automatic landing systems for civil aviation operations. However, an instrument landing system may be designed to permit an approach to a point several hundreds of feet above a landing site under conditions of very low ceiling and visibility.

The present apparatus may be utilized while a pilot is making an instrument landing. At many airports utilizing an instrument landing system, the electronic glide slope signal generated is known in advance. By way of example, let it be assumed that such a glide path has been electronically preset at an angle of 2.6°. If under the conditions of flight, the pilot expects a ground speed of 130 knots, the pilot would set this speed in the ground speed window of the computer.

This estimated ground speed is the air speed of the aircraft as shown on the air speed indicator in the cockpit of the airplane plus or minus the head wind or tail wind correction which would be obtained by radio from a control tower or some other source. For example, if the air speed indicated in the cockpit is 140 knots and a head wind existed which was 10 knots, the estimated ground speed would be 130 knots. By setting 130 knots in the ground speed window 22 of the present apparatus, the pilot would know now from observing the data in window 18 corresponding to the 2.6° glide slope that he should expect a rate of descent of approximately 600 feet/minute.

It should be noted that the rate of descent indicator in most aircraft cockpits cannot be read with greater accuracy than plus or minus fifty feet/minute (and with no greater accuracy than plus or minus 100 feet/minute at a glance), so there is no value in having this information to the nearest foot. During the approach, let it be assumed that the pilot in this example notes that the rate of descent is much higher. He will now be alert to the possibility of existence of some external factor acting to change the predicted course or path of the aircraft. An example of such a factor is "wind sheer."

If while following the electronic glide slope signal the pilot observes that the rate of descent in the aircraft is higher than expected, e.g., 700 feet/minute, the computer may be used to provide the pilot with information that the ground speed has increased to 150 knots. Hence, the pilot will become aware of the presence of a ten knot tail wind.

If, as in our example, the pilot notes the apparent presence of a tail wind, but the wind speed and direction provided by radio from the control tower is still a 10 knot head wind, the pilot is now alerted for potential problems. In actual operation, such a situation may indicate that the wind will probably change very quickly when the aircraft descends to an altitude of about 200 to 300 feet.

The change in speed of the relative wind may be in the order of twenty knots, which, in the case of many aircraft, could cause a rapid and drastic change in the rate of descent. Such a change in the rate of descent has been the cause of many accidents. However, an alert pilot would be able to maintain control of his aircraft in such a situation, and the present invention is useful for alerting pilots of such potential dangers and hence, reducing the possibility of an accident.

EXAMPLE III

A majority of airport and runway combinations use a non-precision approach procedure. These types of approaches may also have to be made at precision approach airports under conditions wherein, say, an instrument landing system (ILS) exists with the glide slope signal unserviceable, an ILS approach is made from an opposite end of a runway where no glide path signal is installed, a VOR (very high frequency omnirange) approach is made with no glide slope guidance, a VOR/DME (very high frequency omnirange/distance measuring equipment) approach is made with no glide slope guidance with a mileage read-out or an ADF (automatic direction finder) approach is made with no glide slope guidance. Mistakes during non-precision approaches account for the highest number of accidents during instrument flight, and it is under such circumstances where the apparatus of the present invention may find its greatest usefulness.

By way of example, assume that an airport is at 820 feet above sea level (asl), and the runway to be used has a heading of 043°. Referring to standard FAA instrument chart books, a pilot is able to learn that a non-precision approach requires that he maintain 2,600 feet asl altitude until he is inbound of a marker and is lined up with the runway VOR heading of 043°. Similarly, from the instrument chart book, the pilot learns that the aircraft will pass over the VOR transmitter at 2,300 feet asl and that he should begin his descent over the next 4.6 miles to 1,500 feet asl which corresponds to 700 feet above the ground. If the pilot sees the runway, he may land. Otherwise, the pilot should overshoot and use an appropriate overshoot or "go around" procedure. The pilot notes that 2,300 feet over the VOR transmitter is actually 1,480 feet above the ground (2,300 less 820 = 1480).

Using the apparatus of the present invention, it is noted that on the grid portion 42 a 1,480 feet altitude and a 4.6 (nautical) mile distance from the runway corresponds to a 3° glide slope. Knowing that the aircraft has an estimated ground speed of 130 knots, the computer portion of the present invention may be utilized. By setting "130" next to the indicator arrow 24 in the ground speed window 22, it may be determined from scale 78 that the time to fly along the glide path to the threshold of the airport is approximately 2 minutes and 10 seconds.

By looking now to the descent rate scale, it can be determined that for a 3° glide slope, the aircraft should have an average rate of descent of 680 feet/minute (actually, 689 feet/minute).

Utilizing the data obtainable from the apparatus of the present invention, the pilot is able to monitor the descent of his aircraft to 1,500 feet asl which corresponds to 700 feet above the ground. Letting 700 feet be a hypothetical minimum decision altitude, and further assuming that a 1 mile minimum visibility is required to land, one of the key values of the present apparatus may now be illustrated.

Upon examination of the 3° glide slope on the grid portion, it can be seen that at an altitude of 700 feet above the runway, the aircraft is a distance of 2 miles from the threshold. If the visibility is actually 1 mile, the aircraft must maintain 700 feet until the runway is in view. If the visibility is actually one mile, then the aircraft will not be permitted to land until it is approximately 1 mile from the airfield. However, it may be seen from the grid portion of the apparatus of the present invention that the glide slope required to descend to the threshold from this altitude is in excess of 5° and is closer to about 6 ½°. Examining the descent rate window 18 for the new glide slope of 5°, it can be seen that the descent rate is in excess of 1,100 feet/minute (for a glide slope of 6°, the descent would be twice that for 3° or twice 680 feet/minute = 1,360 feet/minute).

Most large jet aircraft cannot exceed 700 to 800 feet/minute for the last few hundred feet of descent. If a large jet aircraft exceeds this rate of descent, the aircraft may be descending too fast to control the aircraft to "round out" or flair for the landing. The pilot would know that a safe landing may not be able to be made.

If the pilot of the aircraft carries out the descent in the hypothetical airport while trying not to exceed the maximum descent for his aircraft, it can be determined from the grid portion of the present apparatus that the pilot might use up to one mile to descend to the runway. Assuming that the runway is approximately 5,500 feet long, it can be readily determined that the aircraft will touchdown near the far end of the runway and would overrun.

The apparatus of the present invention would provide a monitor of a descent into this hypothetical airport. A pilot utilizing the apparatus of the present invention would know before making this approach that if he does not have 2 miles visibility, he should consider overshooting the airport and possibly diverting to another landing site. To try and land an aircraft under minimum weather conditions could present the pilot with an unsafe procedure. The grid portion of the present apparatus graphically depicts the situation and does not require the pilot to juggle several numbers in his mind to visually form an image of the situation.

In larger airline transport type aircraft with extra crew, the present apparatus can be monitored by an extra pilot to insure that the flight profile corresponds to the predicted glide path.

SUMMARY OF ADVANTAGES

It will be appreciated that in fabricating a combination landing approach computer and flight profile monitor according to the present invention, certain significant advantages are provided.

In particular, the present apparatus provides a pilot with a visual representation of a landing profile and eliminates potential errors which may occur if an attempt is made to mentally visualize a flight profile utilizing a set of computed values.

With the visual display of the present invention, the pilot is able to "see" the obstruction line lying beneath the glide path. This will encourage the pilot to remain on the glide path rather than duck down lower under adverse weather conditions.

The apparatus of the present invention may be fully operated with one hand and may be utilized by a solo pilot making an instrument approach. In addition, the configuration of the apparatus provides a reference in order to provide immediate orientation of the computer portion.

The present invention functionally relates descent rate, ground speed, altitude, distance to threshold, glide slope and time to threshold simultaneously and has the further advantage of requiring only one input parameter to set the computer.

Thus it is apparent that there has been provided, in accordance with the invention, a combination landing approach computer and flight profile monitor that substantially satisfies the objects and advantages set forth above. Although the present invention has been described in conjunction with specific embodiments thereof, it is evident that many alternatives, modifications, and variations will be apparent to those skilled in the art in light of the foregoing disclosure of the invention. Accordingly, it is intended that all such alternatives, modifications, and variations which fall within the spirit and scope of the invention as defined in the appended claims be embraced thereby.

What is claimed is:

1. A combination aircraft landing approach computer and flight profile monitor apparatus comprising:

a substantially planar base member;

a substantially planar circular disc member rotatably attached to said base member, said base member oriented in a substantially overlying relationship with said disc member;

a plurality of margins on said disc member, said margins having data disposed thereon;

display means for graphically representing a flight profile of a glide path of an aircraft, said display means comprising graph means having a distance-to-threshold abscissa and an altitude ordinate and further having a plurality of glide slopes pre-plotted thereon;

first window means in said base member operable to expose a portion of a first margin of said disc member to provide an indication of a rate of descent functionally related to the ground speed of the aircraft;

glide slope scale means adjacent said first window means for providing a glide slope value corresponding to the rate of descent of the aircraft;

second window means in said base member operable to expose a portion of a second margin of said disc member to provide an indication of a distance to a preselected landing threshold;

time scale means adjacent said second window means for providing a range of time values corresponding to various distances to the landing threshold;

third window means in said base member operable to expose a portion of a third margin of said disc member to provide a display of a preselected ground speed value;

means for rotating said disc member to display the ground speed of the aircraft in said third window means and to simultaneously display a descent rate in said first window means and a distance to threshold in said second window means; and said disc member and said base member being cooperable to functionally relate a preselected ground speed to descent rate, glide slope, time to threshold, distance to threshold, and altitude, and to provide a graphical display of a projected flight profile of an aircraft on a glide path observing said functional relationship for monitoring the descent of an aircraft on the glide path.

2. A landing approach computer apparatus for an aircraft, said apparatus comprising:

a base member;

a movable member movably connected with said base member;
first display means including
descent rate data indicating means carried by one of said base and movable members, and
glide slope data indicating means carried by the other of said base and movable members,
said descent rate data indicating means and said glide slope data indicating means being generally contiguously and relatively movably arranged and operable to display a particular descent rate of an aircraft in alignment with a particular glide slope of said aircraft, with reference to a particular ground speed of said aircraft;
second display means including
distance data indicating means carried by one of said base and movable members, and
time data indicating means carried by the other of said base and movable members,
said distance data indicating means and said time data indicating means being generally contiguously and relatively movably arranged and operable to display a particular distance from said aircraft to a location in alignment with a particular time required for said aircraft to reach said location with reference to a particular ground speed of said aircraft;
third display means including
ground speed data indicating means carried by one of said base and movable members,
reference means carried by the other of said base and movable members,
said ground speed data indicating means and said reference means being generally contiguously and relatively movably arranged and operable to selectively display a particular ground speed of said aircraft in alignment with said reference means; and
means for effecting relative movement of said movable member and said base member and concurrently
effect relative movement between said ground speed data indicating means and said reference means operable to bring a preselected, particular ground speed into alignment with said reference means in said third display means,
effect relative movement between said descent rate data indicating means and said glide slope data indicating means operable to bring a said particular descent rate into alignment with a said particular glide slope in said first display means, in relation to said preselected, particular ground speed, and
effect relative movement between said distance data indicating means and said time data indicating means operable to bring a said particular distance to said location into alignment with a said particular time required to reach said location in said second display means, in relation to said preselected, particular ground speed;
said first, second, and third display means being co-operable to concurrently, selectively, and visually display mutually correlated data relating to a particular aircraft landing approach including
an indication of ground speed of said aircraft,
an indication of a time required for said aircraft to reach said objective,
an indication of a distance between said aircraft and said objective,
an indication of a descent rate for said aircraft, and
an indication of a glide slope for said aircraft.

3. A landing approach computer apparatus for an aircraft, said apparatus comprising:
a base member;
a movable member movably connected with said base member;
first display means including
descent rate data indicating means carried by one of said base and movable members, and
glide slope data indicating means carried by the other of said base and movable members,
said descent rate data indicating means and said glide slope data indicating means being generally contiguously and relatively movably arranged and operable to display a particular descent rate of an aircraft in alignment with a particular glide slope of said aircraft, with reference to a particular ground speed of said aircraft;
second display means including
distance data indicating means carried by one of said base and movable members, and
time data indicating means carried by the other of said base and movable members,
said distance data indicating means and said time data indicating means being generally contiguously and relatively movably arranged and operable to display a particular distance from said aircraft to a location in alignment with a particular time required for said aircraft to reach said location with reference to a particular ground speed of said aircraft;
third display means including
ground speed data indicating means carried by one of said base and movable members,
reference means carried by the other of said base and movable members,
said ground speed data indicating means and said reference means being generally contiguously and relatively movably arranged and operable to selectively display a particular ground speed of said aircraft in alignment with said reference means;
means for effecting relative movement of said movable member and said base member and concurrently
effect relative movement between said ground speed data indicating means and said reference means operable to bring a preselected, particular ground speed into alignment with said reference means in said third display means,
effect relative movement between said descent rate data indicating means and said glide slope data indicating means operable to bring a said particular descent rate into alignment with a said particular glide slope in said first display means, in relation to said preselected, particular ground speed, and
effect relative movement between said distance data indicating means and said time data indicating means operable to bring a said particular distance to said location into alignment with a said particular time required to reach said location in said second display means, in relation to said preselected, particular ground speed; and fourth display means including
flight profile means carried by one of said base and movable members and operable to display an indication of a flight profile, generally reflective of a particular
glide slope relating to data displayed by said second display means, and
data relating to altitude of said aircraft;

said first, second, third, and fourth display means being cooperable to concurrently, selectively, and visually display mutually correlated data relating to a particular aircraft landing approach including
an indication of a profile for said aircraft,
an indication of ground speed of said aircraft,
an indication of a time required for said aircraft to reach said objective,
an indication of a distance between said aircraft and said objective,
an indication of a descent rate for said aircraft, and an indication of a glide slope for said aircraft.

4. A landing approach computer apparatus for an aircraft, said apparatus comprising:
a base member;
a rotatable member rotatably connected with said base member;
first display means including
descent rate data indicating means carried by one of said base and rotatable members, and
glide slope data indicating means carried by the other of said base and rotatable members,
said descent rate data indicating means and said glide slope data indicating means being generally contiguously and relatively movably arranged and operable to display a particular descent rate of an aircraft in alignment with a particular glide slope of said aircraft, with reference to a particular ground speed of said aircraft;
second display means including
distance data indicating means carried by one of said base and rotatable members, and
time data indicating means carried by the other of said base and rotatable members,
said distance data indicating means and said time data indicating means being generally contiguously and relatively movably arranged and operable to display a particular distance from said aircraft to a location in alignment with a particular time required for said aircraft to reach said location with reference to a particular ground speed of said aircraft;
third display means including ground speed data indicating means carried by one of said base and rotatable members,
reference means carried by the other of said base and rotatable members,
said ground speed data indicating means and said reference means being generally contiguously and relatively movably arranged and operable to selectively display a particular ground speed of said aircraft in alignment with said reference means;

means for effecting relative rotational movement of said rotatable member and said base member and concurrently
effect relative movement between said ground speed data indicating means and said reference means operable to bring a preselected, particular ground speed into alignment with said reference means in said third display means,
effect relative movement between said descent rate data indicating means and said glide slope data indicating means operable to bring a said particular descent rate into alignment with a said particular glide slope in said first display means, in relation to said preselected, particular ground speed, and
effect relative movement between said distance data indicating means and said time data indicating means operable to bring a said particular distance to said location into alignment with a said particular time required to reach said location in said second display means, in relation to said preselected, particular ground speed; and fourth display means including
flight profile means carried by one of said base and rotatable members and operable to display an indication of a flight profile, generally reflective of a particular
glide slope relating to data displayed by said second display means, and
data relating to altitude of said aircraft;

said first, second, third, and fourth display means being cooperable to concurrently, selectively, and visually display mutually correlated data relating to a particular aircraft landing approach including
an indication of a profile for said aircraft,
an indication of ground speed of said aircraft,
an indication of a time required for said aircraft to reach said objective,
an indication of a distance between said aircraft and said objective,
an indication of a descent rate for said aircraft, and an indication of a glide slope for said aircraft.

* * * * *